United States Patent [19]

Labenz

[11] 4,036,674
[45] July 19, 1977

[54] FABRIC REPAIR TOOL

[76] Inventor: James W. Labenz, 4426 Sheffield Ave., Philadelphia, Pa. 19136

[21] Appl. No.: 645,646

[22] Filed: Dec. 31, 1975

[51] Int. Cl.² .......................................... B32B 35/00
[52] U.S. Cl. ...................................... 156/98; 30/310;
156/258; 156/263; 156/229; 156/514; 264/36;
408/87; 408/97; 408/99; 408/103
[58] Field of Search .............. 408/87, 95, 97, 99,
408/100, 103; 30/310, 289, 316; 156/94, 98,
258, 263, 514, 229; 264/36

[56] References Cited
U.S. PATENT DOCUMENTS

| | | | |
|---|---|---|---|
| 1,113,030 | 10/1914 | McLaurin | 156/98 |
| 3,271,217 | 9/1966 | Mapson | 156/98 |
| 3,456,346 | 7/1969 | Snyder | 30/310 |
| 3,558,385 | 1/1971 | Ronning | 156/98 |
| 3,701,352 | 10/1972 | Bosworth | 408/97 |
| 3,772,114 | 11/1973 | Kowalchuk | 156/94 |
| 3,786,564 | 1/1974 | Acheson | 30/310 |

Primary Examiner—Edward G. Whitby
Attorney, Agent, or Firm—Weiser, Stapler & Spivak

[57] ABSTRACT

A repair tool for performing quick, inexpensive and almost invisible repairs on fabrics which have been subjected to local damage. The tool comprises a base plate having core pins and ring pins projecting upwardly therefrom. An annular holding ring overfits the base plate and sandwiches the fabric to be repaired therebetween. A rotary knob including a circular razor turns within the holding ring central opening to cut a perfect circular hole in the fabric to remove the damaged area. The tool is utilized to cut a similar circular patch from an undamaged portion of the fabric. The patch is then applied to the circular hole in the damaged fabric and is secured thereto by rearwardly positioned adhesive faced material to provide an almost invisible repair.

23 Claims, 9 Drawing Figures

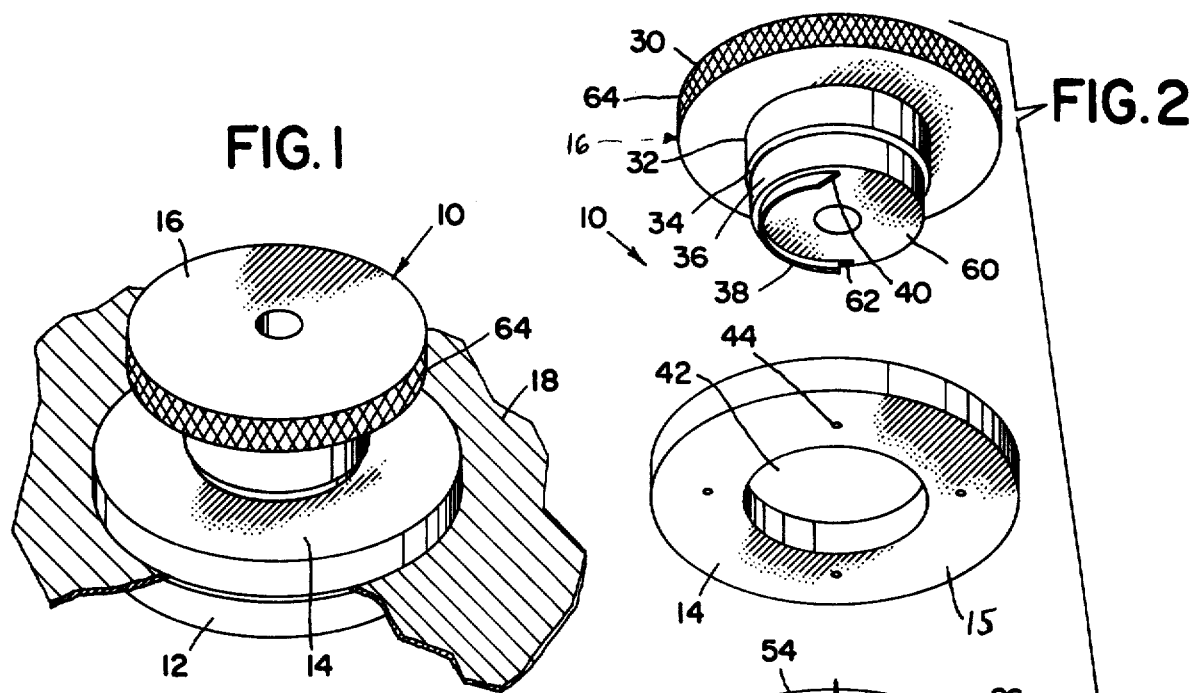
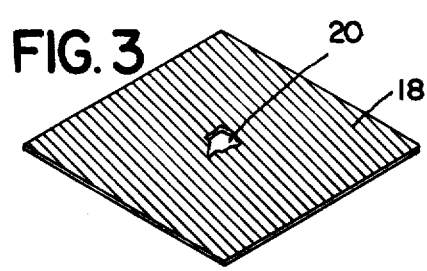
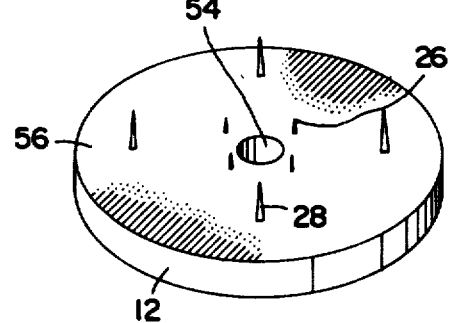
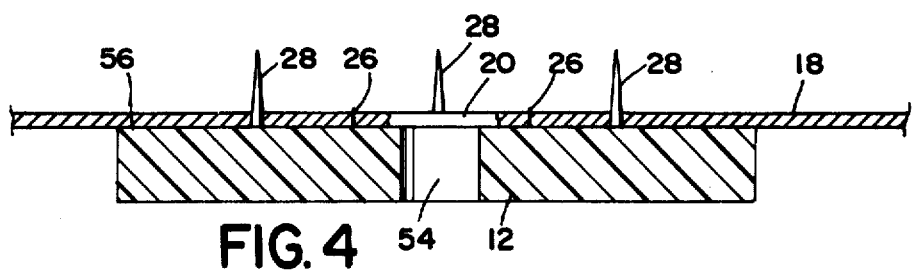
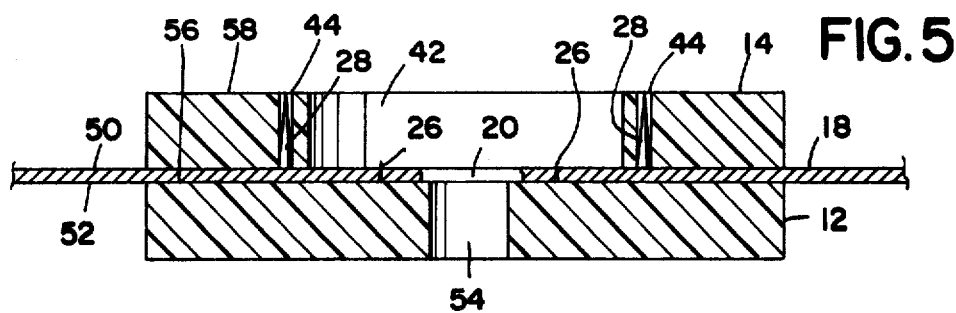

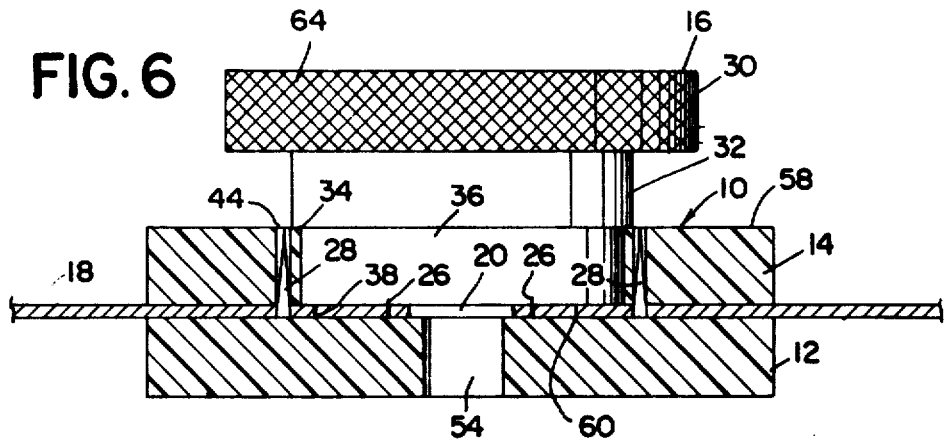
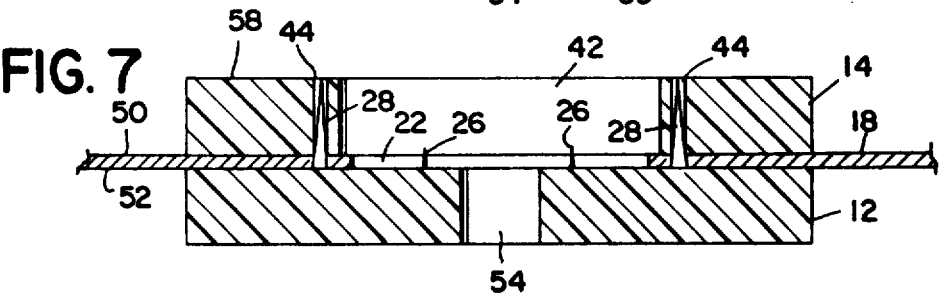
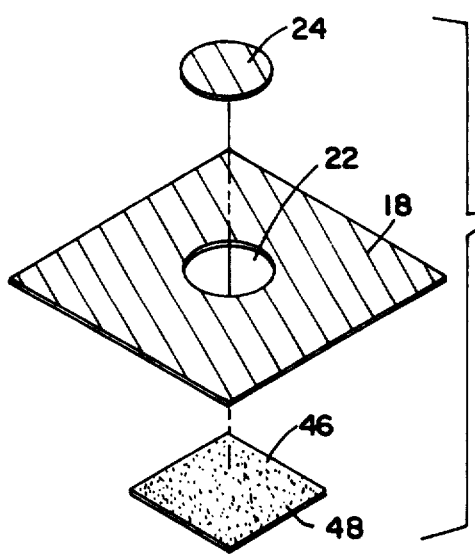
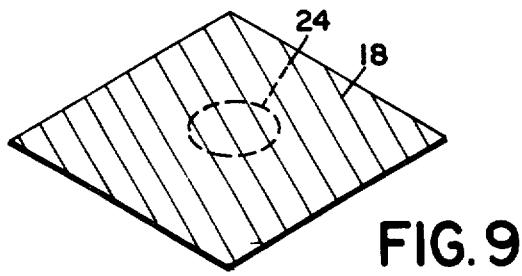

FABRIC REPAIR TOOL

BACKGROUND OF THE INVENTION

The present invention relates generally to the field of fabric repairs, and more particularly is directed to a tool and the method for utilizing the tool to effect the application of a substantially invisible patch.

Fabrics such as utilized for garments and for the upholstery of furniture are frequently subjected to local damage in the form of cigarette burn holes, small tears or sometimes to small stains which are not responsive to usual cleaning techniques. In such circumstances, it has been a usual prior art practice to repair the local damaged area by a process known as reweaving. The reweaving technique employs the use of identical threads taken from other portions of the garment and then sewing or weaving the thread in and about the damaged area by utilizing stitches substantially identical to the stitch of the fabric itself. Such technique produces an entirely satisfactory result but has the drawback of being extremely expensive when considering the size of the area being repaired. The reweaving technique requires skilled operators and is quite tedious and time consuming even for those skilled in the work. Accordingly, repairs accomplished by the reweaving process are necessarily expensive and in certain cases would even be prohibitively expensive.

SUMMARY OF THE INVENTION

The present invention relates to a fabric repair tool and the method of using the same for repairing in a quick and inexpensive manner garments and upholstery fabrics which have been subjected to local damage.

The fabric repair tool of the present invention includes a base plate which has projecting upwardly therefrom a plurality of generally centrally positioned core pins and a plurality of more pheripherally positioned ring pins. An annular ring overfits the base plate and is equipped with a plurality of openings to receive the ring pins therein. A relatively large hole, for example, approximately one inch in diameter is concentrically drilled, formed or otherwise provided in the annular holding ring to expose the damaged portion of the fabric therewithin. The fabric to be repaired is sandwiched between the holding ring and the base plate and is securely held in place. The core pins and the ring holding pins all penetrate the fabric and cooperate to prevent any movement of the fabric relative to the tool during the repair process.

The cutting portion of the tool comprises a knob of three tier construction in which the uppermost and largest tier is knurled on the edge to facilitate gripping. The second tier is slightly larger in diameter than the center hole in the annular holding ring and terminates downwardly in a shoulder at the smallest or lowermost tier. The shoulder rides upon the top surface of the holding ring when the knob is turned to cut the circular patch. The smallest or lowermost tier is fabricated to a diameter suitable to insert within the opening in the holding ring in a relatively tight, sliding engagement so as to prevent relative radial movement between the turning knob and the holding ring when the tool is in use.

The bottom of the smallest tier is grooved concentrically to receive a generally semi-circular cutting razor therein for cutting a finished hole to remove the damaged area from the fabric to be repaired. The size of the finished hole which can be cut can be readily varied by varying the diameter of the razor groove and the razor. Thus, if the hole to be cut is desired to be one inch in diameter, a one inch in diameter razor can be employed. Similarly, larger or smaller openings can be made by simply varying size of the razor. It is contemplated that the tool could be fabricated to include a single base plate, a single holding ring and a plurality of knobs, each having a cutting blade suitable to cut a finished hole in the fabric of a different size.

It is therefore an object of the present invention to provide an improved fabric repair tool of the type set forth.

It is another object of the present invention to provide a novel fabric repair tool incorporating means to precisely cut a hole in the damaged fabric and to precisely cut a repair patch to replace the damaged area.

It is another object of the present invention to provide a novel fabric repair tool comprising circular razor means to cut a circular hole in the damaged fabric and to cut a circular patch for insertion into the circular hole.

It is another object of the present invention to provide a novel fabric repair tool comprising fabric holding means, circular razor means to cut a circular hole in the damaged fabric and turning knob means to turn the circular razor means, the turning knob means being rotatable within the fabric holding means.

It is another object of the present invention to provide a novel method for repairing a damaged fabric comprising the steps of cutting a circular hole in the fabric to remove the damaged area, cutting a circular patch in fabric identical to the damaged fabric, applying the patch within the hole and then aligning the weave and design of the patch with the weave and design of the fabric and fixing the patch in position by applying a backing of iron-on adhesive material.

It is another object of the present invention to provide a novel fabric repair tool that is rugged in construction, inexpensive in manufacture and troublefree when in use.

Other objects and a fuller understanding of the invention will be had by referring to the following description and claims of a preferred embodiment thereof, taken in conjunction with the accompanying drawings, wherein like reference characters refer to similar parts throughout several views and in which:

BRIEF DESCRIPTION OF THE DRAWINGS

FIG. 1 is an isometric view of the fabric repair tool of the present invention in use.

FIG. 2 is an exploded, isometric view of the fabric repair tool.

FIG. 3 is an isometric view of a portion of a fabric having a local damaged area therein.

FIG. 4 is an enlarged, cross-sectional view showing the damaged fabric applied over the base plate.

FIG. 5 is an enlarged, side elevational view similar to FIG. 4 showing the holding ring applied over the fabric and base plate.

FIG. 6 is an enlarged, side elevational view similar to FIG. 5 showing the turning knob and razor positioned within the holding ring prior to cutting.

FIG. 7 is a side elevational view similar to FIG. 5 showing the fabric after the circular hole has been cut by the razor.

FIG. 8 is an exploded, isometric view showing the circular patch, the circular hole cut in the fabric and the iron-on adhesive backing.

FIG. 9 is an isometric view showing the completed repair.

DESCRIPTION OF THE PREFERRED EMBODIMENT OF THE INVENTION

Although specific terms are used in the following description for the sake of clarity, these terms are intended to refer only to the particular structure of my invention selected for illustration in the drawings and are not intended to define or limit the scope of the invention.

Referring now to FIGS. 1 and 2, there is shown a fabric repair tool 12 suitable for use in making quick and inexpensive repairs in fabrics which have a small damaged area such as may be caused by a cigarette burn. The repair tool 10 is suitable for use on fabrics in general including polyester knit fabrics, cotton fabrics and all blends. Additionally, the tool can be employed for use in repairing local damaged areas in vinyl plastics and other plastics in thin gauges.

The fabric repair tool 10 of the present invention comprises generally a base plate 12, a holding ring 14 and a turning knob 16. The parts may be fabricated of a suitale rigid material, for example, an acrylic plastic, wood, or other sturdy material which can be easily worked to the desired shape and which can retain its form after repeated cycles of use.

The base plate 12 is generally discoid in configuration and may include a relatively small, concentric locating opening 54. A plurality of core pins 26 are anchored in the base plate 12 and extend upwardly therefrom. The core pins 26 are preferably metallic and can be located approximately five-sixteenth of an inch from the center of the base plate 12. The core pins 26 extend upwardly from the top surface 56 of the base plate 12, a distance of approximately one-sixteenth of an inch to engage and securely hold the fabric 18 to be repaired. In the embodiment illustrated, the core pins 26 are equidistant from the base plate center and are equally spaced apart at ninety degree intervals.

A plurality of ring engaging pins 28 also extend upwardly from the top surface 56 of the base plate 12 and also are preferably metallic in construction. The ring pins are located approximately 1 1/16 inch from the center of the base plate 12 and, as illustrated, are positioned in angular offset relationship from the core pins of 45°. It will be noted that the core pins 26 are spaced apart in angular relationship of 90° as are the ring pins 28. Accordingly, when the fabric 18 is applied to the base plate 12 for repair purposes as illustrated in FIG. 4, one pin 26 or 28 engages and pierces the fabric 18 at circular spaced intervals of every 45° for fabric securing purposes. It will be appreciated that while a plurality of four core pins 26 and four ring holding pins 28 are illustrated, more or fewer core pins and ring pins may be employed if so desired and still come within the meaning and intent of this invention.

The holding ring 14 is generally formed to an annular configuration and defines a circular center opening 42. The bottom surface 15 of the holding ring 14 is provided with a plurality of holes 44 which align over and receive therewithin the ring holding pins 28. Accordingly, the number of holding ring holes 44 should equal the number of ring pins 28. As best seen in FIG. 5, the holding ring 14 overfits the base plate 12 and sandwiches the fabric 18 to be repaired therebetween. As best seen in FIGS. 4 and 5, the core pins 26 and the ring pins 28 project upwardly through the fabric 18 to securely hold the fabric 18 during the hole cutting process as hereinafter more fully set forth. It will be noted that the diameter of the holding ring center opening 42 is larger than the radial distance that the core pins 26 are positioned from the center of the base plate. The pins 26 therefore project into the space defined by the center opening 42 when the holding ring 14 is applied over the fabric 18 and the base plate 12.

The turning knob 16 comprises three tiers, namely, on outer tier 30, a middle tier 32 and an inner tier 36 which may be integrally molded or otherwise formed in a unitary manner. Alternately, the turning knob 16 may be composed of three separate tiers which are concentrically positioned and cemented together. The outer or uppermost tier 30 is preferably knurled or otherwise treated at the peripheral edge 64 thereof to facilitate gripping and turning the turning knob 16 for hole cutting purposes as hereinafter more fully set forth.

The middle tier is generally discoid in configuration and as best seen in FIG. 6, is formed to a diameter slightly greater than the diameter of the holding ring center opening 42. A shoulder 34 is defined between the middle tier 32 and the inner or lowermost tier 36 and this shoulder 34 rides upon the top surface 58 of the holding ring 14 when the device is in use.

The lowest tier or smallest tier 36 extends downwardly from bottom of the middle tier 32 and is concentric therewith to define the shoulders 34. The lowest tier 36 is fabricated generally of discoid configuration of a diameter to fit within the central opening 42 of the holding ring 14 in an easy circular sliding engagement without binding and without undue looseness. Thus, the interaction of the lowest tier 36 within the central opening 42 of the holding ring 14 serves as a guide to prevent any substantial radial movement of the turning knob 16 relative to the ring 14 and the base plate 12 when the device is in use. The interrelationship of the assembled parts immediately prior to use is illustrated in FIG. 6.

The bottom surface 60 of the smallest tier 36 is provided with a circular groove 62 near the outer periphery thereof to receive the circular razor 38 therein. The razor may be a press fit within the groove 62 or may be cemented therein as may be desired or necessary to securely affix the razor 38 to the bottom surface 60 of the lowest tier 36. As best seen in FIGS. 2 and 6, the razor 38 projects below the lowest surface 60 a distance sufficient to cut through the thickness of the fabric 18 being repaired. If desired, and if necessary to cut certain fabrics, a circular groove (not shown) can be cut into the top surface 56 of the base plate 12 to form an arcuate path within which the razor 38 can project below the bottom side 52 of the fabric 18 to assure complete fabric severing during the fabric hole 22 cutting operation.

It will be noted that the thickness of the lowest tier 36 is substantially equal to the thickness or height of the holding ring 14 so that when the turning knob 16 is applied to the holding ring 14 with the shoulder 34 resting upon the top surface 58 of the holding ring 14, the razor 38 will project below the lowest surface 60 for the fabric hole cutting purposes.

In order to use the fabric repair tool 10 of the present invention, the fabric 18 to be repaired is placed with the damaged portion 20 directly over the small hole 54 in the base plate 12. The fabric 18 is drawn over the pins 28 and the core pins 26 and is stretched slightly in all directions to secure a tight and even fit on the base plate. Fabric 18 should not be so stretched as to distort the grain or weave in the material. After all of the pins 26, 28 pierce the fabric 18 to secure it in place on the base plate 12, the holding ring 14 is applied over the base plate with the holes 44 aligned over the ring pins 28. The holding ring 14 is then pressed down tightly over the fabric 18 against the base plate 12 to sandwich the fabric 18 between the base plate 12 and the holding ring 14.

With the fabric 18 thus securely held in position, with the damaged area 20 exposed through the center opening 42 of the holding ring 14, the turning knob 16 is downwardly inserted with the lowest tier 36 being positioned within the holding ring 14 central opening 42 as in FIG. 6. It will be noted that initially the cutting razor 38 will position against the top surface or finished side 50 of the fabric 18 and the shoulder 34 will consequently be spaced above the top surface 58 of the holding ring 14 a distance equal to the thickness of the fabric 18. Then the turning knob 16 is grasped by the knurled edge 64 and is rotated within the holding ring 14 slowly and evenly while applying a slight downward pressure. This downward pressure together with the turning of the knob 16 forces the inclined cutting edge 40 of the razor 38 downwardly and against the fabric 18 causing the tool to cut a finished, even, circular hole 22 in the fabric 18. The cut out portion with the hole or damage 20 is then discarded and is no longer utilized in the work.

The operator then selects a piece of the fabric 18 which is identical to the area in which the finished hole 22 has been cut. In the case of garments, this can usually be found as excess material in the seat of pants, the inside fold of a cuff or in portions of jackets wherein panels are joined. In the case of upholstery material, excess material can usually be found at a hidden edge. By utilizing the fabric repair tool 10 in the same manner as employed to cut the hole 22 in the fabric 18, a patch or plug 24 can be cut by the tool. It will be noted that the razor 34 will be turned to subscribe the identical arc when cutting either the finished hole 22 or the patch or plug 24, and accordingly, the patch 24 will precisely fit within the hole 22 inasmuch as the same tool and the same razor 38 is employed for both operations. When cutting the patch or plug 24, care should be exercised that a portion of the fabric will be utilized wherein the grain and the design of the fabric at the patch or plug 24 will match and align with the weave and design of the garment or fabric 18 at the hole 22.

When a complete circle has been subscribed by the turning knob 16 to cut the circular patch 24, the patch 24 is then removed from the base plate 12 and carefully placed in the finished hole 22 which had previously been cut in the fabric 18. Care should be exercised to align the grain or design of the fabric 18 and the plug 24. Then a length of iron-on material 46 of well-known conventional design is applied against the bottom side 52 of the fabric 18 with its adhesive side 48 applied against the bottom side 52 of the fabric 18. The iron-on material 46 should be of sufficient size to completely cover the plug 24 and the area about the hole 22 and to extend radially at least a half inch in all directions. Then by following the instructions of the manufacturer of the iron-on material, the plug 24 can be secured within the finished hole 22 in a relatively permanent manner. By exercising care in matching grain and design of the patch 24 and the garment material 18 at the finished hole 22, excellent results can be obtained, even by unskilled operators.

Preferably, as illustrated in FIG. 2, the circular razor 38 is formed at one end thereof to provide an inclined cutting edge 40 to facilitate fabric cutting to form the finished hole 22. The turning knob 16 should be rotated within the holding ring 14 in the direction to force the inclined edge 40 to engage the fabric 18 to perform the hole cutting procedure.

Although I have described the present invention with reference to the particular embodiments herein set forth, it is understood that the present disclosure has been made only by way of example and that numerous changes in the details of construction may be resorted to without departing from the spirit and scope of the invention. Thus, the scope of the invention is not to be limited by the foregoing specification, but rather only by the scope of the claims hereto appended.

What I claim is:
1. A fabric repair tool comprising
   a. a base plate;
   b. fabric holding means extending from the base plate to engage the fabric;
   c. hold down ring means overlying the fabric holding means to sandwich the fabric therebetween,
      1. said hold down ring means defining an opening;
   d. turning knob means insertable into the opening,
      1. said turning knob means comprising a cutter, the cutter cutting through a part of the fabric to remove a damaged area and to form a hole in the fabric when the turning knob means is inserted into the opening and
      2. a portion of said fabric holding means being adapted to engage the damaged area during the cutting.
2. The fabric repair tool of claim 1 wherein the fabric holding means comprise a plurality of core pins, at least some of said core pins piercing the fabric at the damaged area to hold the fabric in place.
3. The fabric repair tool of claim 2 wherein the core pins are concentrically located.
4. The fabric repair tool of claim 2 wherein the core pins are equidistantly spaced from each other.
5. The fabric repair tool of claim 1 wherein the fabric holding means comprise a plurality of ring pins, and said hold down ring means comprise a plurality of openings, at least some of the said ring pins being positioned within the openings when the fabric is sandwiched.
6. The fabric repair tool of claim 5 wherein the ring pins pierce the fabric radially outwardly from the damaged area.
7. The fabric repair tool of claim 5 wherein the ring pins are equidistantly spaced from each other.
8. The fabric repair tool of claim 2 wherein the fabric holding means comprise a plurality of ring pins, the said ring pins being positioned to pierce the fabric radially outwardly from the damaged area to hold the fabric.
9. The fabric repair tool of claim 8 wherein the core pins are equidistantly spaced from each other.
10. The fabric repair tool of claim 9 wherein the ring pins are equidistantly spaced from each other.
11. The fabric repair tool of claim 10 wherein a ring pin is angularly offset from a core pin by an angle of approximately 45°.
12. The fabric repair tool of claim 1 wherein the turning knob means comprises a plurality of concentric tiers.

13. The fabric repair tool of claim 12 wherein the lowermost tier is fabricated to a diameter suitable to provide a sliding, rotatable engagement between the turning knob means and the hold down ring means when the lowermost tier is positioned within the opening.

14. The fabric repair tool of claim 13 wherein the turning knob means comprises a second tier of larger diameter than the lowermost tier, the bottom of said second tier contacting the hold down ring means when the lowermost tier is positioned within the ring.

15. The fabric repair tool of claim 1 wherein the cutter is circular.

16. The fabric repair tool of claim 15 wherein the cutter includes an inclined cutting edge said cutting edge being angularly inclined from the circular path of travel.

17. The fabric repair tool of claim 14 wherein the cutter includes an inclined cutting edge said cutting edge being angularly inclined from the circular path of travel.

18. The method of repairing a damaged fabric comprising the steps of holding the fabric at the damaged area by engaging the fabric between a base plate and a holding ring;

cutting a hole of predetermined shape in the fabric to remove the damaged area without applying another substance;

removing the fabric from contact with the base plate and holding ring;

cutting an identical shaped patch in the fabric without applying a layer of another substance;

applying the patch within the hole and aligning the fabric weave;

affixing the patch in position to remain within the cut hole by laminating material layer to the patch and a portion of the fabric and providing pins in the base plate and holding the fabric by inserting the pins through the fabric near the damaged area while cutting the hole.

19. The method of claim 18 and the additional step of stretching the fabric prior to cutting the hole.

20. The method of claim 18 and the additional step of applying backing to secure the patch to the fabric.

21. The method of claim 20 and the additional step of securing the patch by adhesive.

22. The method of claim 21 and the additional step of applying heat to activate the adhesive.

23. The fabric repair tool of claim 13 wherein the bottom of the lowermost tier overlies the damaged area to prevent substantial vertical movement of the damaged area as the hole is being formed.

* * * * *